US012127164B2

(12) United States Patent
Li et al.

(10) Patent No.: US 12,127,164 B2
(45) Date of Patent: Oct. 22, 2024

(54) WAKE UP SIGNAL TRANSMISSION FOR NR-LIGHT SYSTEM

(71) Applicant: Lenovo (Beijing) Limited, Beijing (CN)

(72) Inventors: Yingying Li, Haidian District (CN); Zhi Yan, Xicheng District (CN); Haipeng Lei, Haidian District (CN); Jie Shi, Haidian District (CN); Haiming Wang, Xicheng District (CN)

(73) Assignee: Lenovo (Beijing) Limited, Beijing (CN)

( * ) Notice: Subject to any disclaimer, the term of this patent is extended or adjusted under 35 U.S.C. 154(b) by 300 days.

(21) Appl. No.: 17/642,366

(22) PCT Filed: Sep. 11, 2019

(86) PCT No.: PCT/CN2019/105374
§ 371 (c)(1),
(2) Date: Mar. 11, 2022

(87) PCT Pub. No.: WO2021/046755
PCT Pub. Date: Mar. 18, 2021

(65) Prior Publication Data
US 2022/0330206 A1     Oct. 13, 2022

(51) Int. Cl.
*H04W 68/02* (2009.01)
*H04W 52/02* (2009.01)
(52) U.S. Cl.
CPC ..... *H04W 68/025* (2013.01); *H04W 52/0229* (2013.01)

(58) Field of Classification Search
CPC ............... H04W 68/025; H04W 76/28; H04W 52/0229
See application file for complete search history.

(56) References Cited

U.S. PATENT DOCUMENTS

2018/0279274 A1\* 9/2018 Sun ..................... H04W 52/367
2019/0036746 A1   1/2019 Hwang et al.
(Continued)

FOREIGN PATENT DOCUMENTS

CN   108781431 A   11/2018
CN   109309555 A   2/2019

OTHER PUBLICATIONS

"International Preliminary Report on Patentability", PCT Application No. PCT/CN2019/105374, Mar. 24, 2022, 5 pages.
(Continued)

*Primary Examiner* — Farid Seyedvosoghi
(74) *Attorney, Agent, or Firm* — FIG. 1 Patents

(57) ABSTRACT

Methods, a remote unit and a base unit are disclosed. According to one embodiment, a method at a base nit, comprising: generating a wake up signal which indicates that a remote unit shall attempt to receive a paging message in a paging occasion, wherein the wake up signal is generated by L base sequences, each of the L base sequences is mapped to a base resource unit, where L is an integer, wherein the base resource unit includes M continuous Physical Resource Blocks (PRBs) in frequency domain and N continuous Frequency Division Multiplexing (OFDM) symbols within a slot in time domain, where M and N are integers; mapping the wake up signal to a frequency-time resource; and transmitting, to the remote unit, the mapped wake up signal in the frequency-time resource.

20 Claims, 16 Drawing Sheets

(56) References Cited

U.S. PATENT DOCUMENTS

2019/0159128 A1* 5/2019 Lin ...................... H04W 68/00
2021/0136687 A1* 5/2021 Liu ...................... H04W 72/00

OTHER PUBLICATIONS

"International Search Report and Written Opinion", PCT Application No. PCT/CN2019/105374, Apr. 3, 2020, 6 pages.

* cited by examiner

WAKE UP SIGNAL TRANSMISSION FOR NR-LIGHT SYSTEM

FIELD

The subject matter disclosed herein generally relates to wireless communications and, more particularly, to wake up signal transmission for NR-light system.

BACKGROUND

The following abbreviations are herewith defined, some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), Universal Mobile Telecommunications System (UMTS), UMTS Terrestrial Radio Access Network (UTRAN), Evolved UTRAN (E-UTRAN), Very Large Scale Integration (VLSI), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Downlink (DL), Uplink (UL), Evolved Node B (eNB), Next Generation Node B (gNB), New Radio (NR), Physical Uplink Shared Channel (PUSCH), Physical Uplink Control Channel (PUCCH), Physical Downlink Control Channel (PDCCH), Physical Downlink Shared Channel (PDSCH), Downlink Control Information (DCI), Resource Block (RB), Physical RB (PRB), Control Resource Set (CORESET), Identification (ID), Network (NW), Search Space (SS), System Information Block (SIB), Synchronization Signal Block (SSB), Narrowband Internet of Things (NB-IoT), Discontinuous Reception (DRX), extended DRX (eDRX), Power Saving Mode (PSM), Wake Up Signal (WUS), Narrowband WUS (NWUS), Paging Occasion (PO), Orthogonal Frequency Division Multiplexing (OFDM), Monitoring Occasion (MO), Bandwidth Part (BWP), Global System for Mobile Communications (GSM).

Narrowband Internet of Things (NB-IoT) is a Low Power Wide Area Network radio technology standard developed by 3GPP to enable a wide range of cellular devices and services including smart parking, utilities, wearables, and industrial solutions. NB-IoT focuses specifically on indoor coverage, low cost, long battery life, and high connection density.

Lower power consumption is one of the most important criteria in NB-IoT application. NB-IoT introduced Discontinuous Reception (DRX) mode and Power Saving Mode (PSM) for saving energy. With PSM, a device is registered with the network but may go into a deep sleep for up to 12.1 days. A device may wake up to send data or do a tracking area update. With DRX, the device needs not to monitor control channels most of the time. In 3GPP Release 13, extended DRX (eDRX) is introduced in which a device may go to sleep for up to 3 hours.

NB-IoT uses a wake up signal (WUS) to wake up a UE. The WUS is transmitted in idle mode only when the UE is required to decode a PDCCH transmission in paging occasions (POs). The narrowband wake up signal (NWUS) is transmitted over 12 subcarriers in the frequency domain in the NB-IoT carrier within available symbols of configured subframes.

The benefit of introducing WUS is that it reduces the unnecessary power consumption related to PDCCH monitoring. Without WUS, the UE would have to monitor the PDCCH for paging at each PO. With the WUS approach, the UE only needs to decode the PDCCH transmission when WUS is detected, otherwise, the UE will stay in sleep mode. This represents an efficiency improvement, especially when considering low activity on the control channels within a cell, e.g. at nighttime.

NB-IoT focus on the lower end of the IoT market for low-power wide area networks. NB-IoT supports peak data rates of <160 kb/s, with at least 15 dB coverage extension and up to 10 years of battery life under certain conditions. NR specification is expected to be extended to support a lighter version of NR, NR-light, for mid-market IoT devices such as smartwatches, video surveillance cameras, and industrial sensors. The peak date rate of NR-light is expected to be 5-10 Mb/s with better power saving and coverage. Schemes for enhanced UE power saving, for example, wake up signal, is also a candidate feature that can be used for NR-light.

This invention relates to NR-light system, especially for wake up signal transmission in NR-light system. This disclosure tried to address, among other things, some issues associated with wake up signal transmission in NR-light system.

SUMMARY

Methods and apparatuses for wake up signal transmission and reception are disclosed.

In one embodiment, a method at a base unit and a base to perform the method are disclosed. The method comprises: generating a wake up signal which indicates that a remote unit shall attempt to receive a paging message in a Paging Occasion (PO), wherein the wake up signal is generated by L base sequences, and each of the L base sequences is mapped to a base resource unit, where L is an integer, wherein the base resource unit includes M continuous Physical Resource Blocks (PRBs) in frequency domain and N continuous Frequency Division Multiplexing (OFDM) symbols within a slot in time domain, where M and N are integers; mapping the wake up signal to a frequency-time resource; and transmitting, to the remote unit, the mapped wake up signal in the frequency-time resource.

Preferably, M is determined according to a bandwidth of a Bandwidth Part (BWP) where the WUS is, a subcarrier spacing of the BWP, and a sequence length of each of the base sequences. N is determined based on a sequence length of each of the base sequences and M.

Preferably, a frequency resource of the frequency-time resource is determined by a start position in frequency domain, a frequency domain repetition number of the base resource unit and M.

Preferably, a time resource of the frequency-time resource is determined by a time domain transmission type and a time domain repetition number of the base resource unit.

Preferably, the time domain transmission type is continuous transmission or is discontinuous transmission.

Preferably, each of the L base sequences contains information related to at least one of a slot index and a symbol index for the first associated PDCCH monitoring occasion in a corresponding PO, and frequency domain position information for the transmission of the corresponding wake up signal.

In another embodiment, a method at a remote unit and a remote unit to perform the method are disclosed. The method comprises: receiving a wake up signal in a frequency-time resource; attempting to receive a paging message in a PO according to the received wake up signal, wherein the wake up signal is consisted of no more than L base sequences each of which is mapped to a base resource unit, where L is an integer, wherein the base resource unit includes M continuous PRBs in frequency domain and N continuous OFDM symbols within a slot in time domain, where M and N are integer.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not, therefore, to be considered to be limiting in scope, the embodiments will be described and explained with additional specificity and detail through the use of the accompanying drawings, in which.

DETAILED DESCRIPTION

Figure 1:
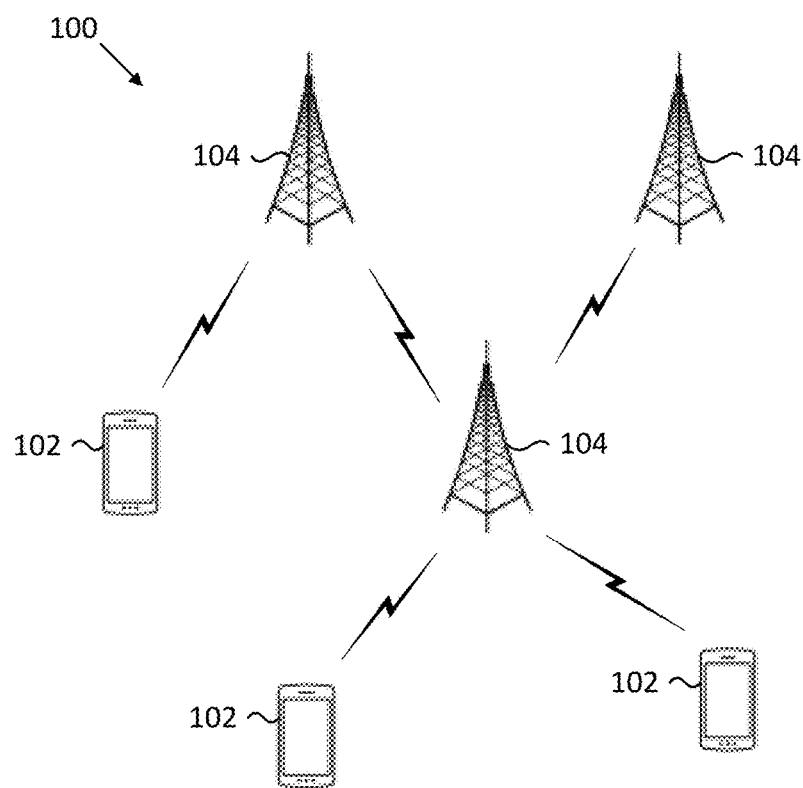
FIG. 1 is a schematic block diagram illustrating one embodiment of a wireless communication system for WUS transmission and reception.

As will be appreciated by one skilled in the art, aspects of the embodiments may be embodied as a system, apparatus, method, or program product. Accordingly, embodiments may take the form of an entire hardware embodiment, an entire software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that may contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scene, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, may be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the schematic flowchart diagrams and/or schematic block diagrams for the block or blocks.

The code may also be stored in a storage device that may direct a computer, other programmable data processing apparatus, or other devices, to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, may be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The description of elements in each figure may refer to elements of proceeding figures. Like numbers refer to like elements in all figures, including alternate embodiments of like elements.

FIG. 1 depicts an embodiment of a wireless communication system 100. The wireless communication system 100 can support WUS transmission and reception. In one embodiment, the wireless communication system 100 includes remote units 102 and base units 104. Even though a specific number of the remote units 102 and the base units 104 are depicted in FIG. 1, it should be noted that any number of the remote units 102 and the base units 104 may be included in the wireless communication system 100.

In one embodiment, the remote units 102 may include computing devices, such as desktop computers, laptop computers, personal digital assistants ("PDAs"), tablet computers, smartphones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smartwatches, fitness bands, optical head-mounted displays, or the like. The remote units 102 may be referred to as subscriber units, mobiles, mobile stations, users, terminals, mobile terminals, fixed terminals, subscriber stations, UE, user terminals, a device, or by other terminology used in the field. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the field. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the field.

In one implementation, the wireless communication system 100 is compliant with the 3GPP 5G NR. More generally, however, the wireless communication system 100 may implement some other open or proprietary communication protocol, for example, WiMAX, among other protocols.

The base units 104 may serve a number of the remote units 102 within a serving area, for example, a cell or a cell sector via a wireless communication link. The base units 104 transmit DL communication signals to serve the remote units 102 in the time, frequency, and/or spatial domain.

Figure 2:
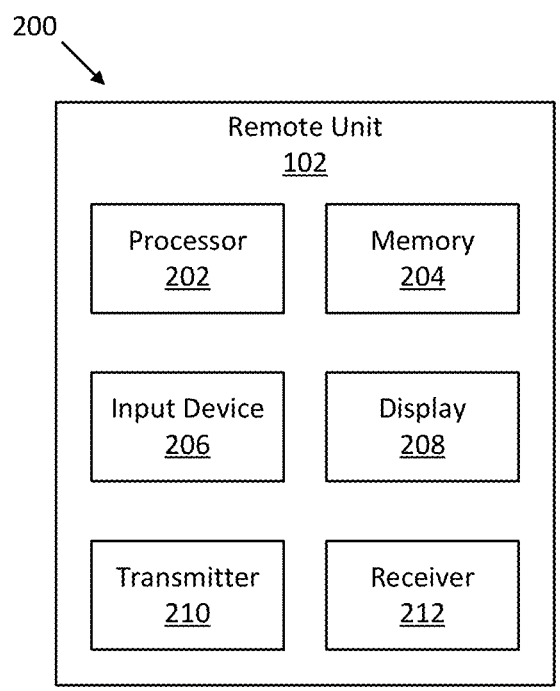
FIG. 2 is a schematic block diagram illustrating one embodiment of an apparatus that may be used to receive WUS.

FIG. 2 depicts one embodiment of an apparatus 200 that may be used to receive WUS. The apparatus 200, in one embodiment, includes a remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include at least one of the processor 202, the memory 204, the transmitter 210 and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, flash memory, or any other suitable non-volatile computer storage device. In some embodiments, the memory 204 includes both volatile and non-volatile computer storage media. In some embodiments, the memory 204 stores data relating to system parameters. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting example, the display 208 may include a wearable display such as a smartwatch, smart glasses, a heads-up display, or the like. Further, the display 208 may be a component of a smartphone, a personal digital assistant, a television, a tablet computer, a notebook (laptop) computer, a personal computer, a vehicle dashboard, or the like.

In certain embodiments, the display 208 includes one or more speakers for producing sound. For example, the display 208 may produce an audible alert or a notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and the display 208 may form a touchscreen or a similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the receiver 212 may be used to receive the broadcast signal. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
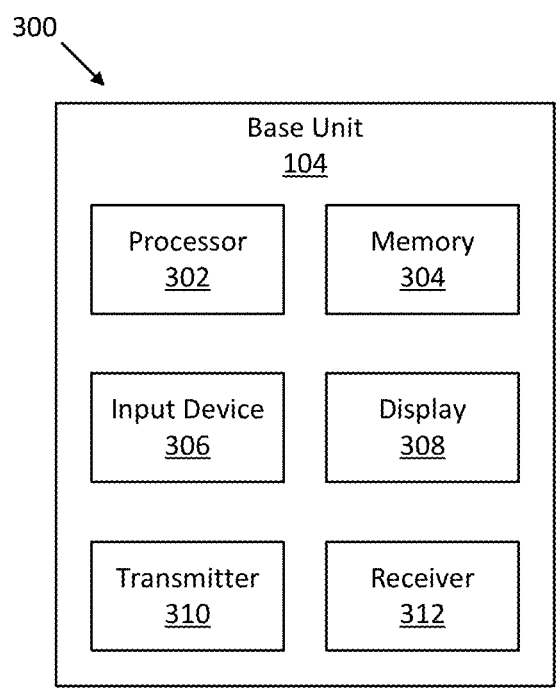
FIG. 3 is a schematic block diagram illustrating one embodiment of an apparatus that may be used to transmit WUS.

FIG. 3 depicts one embodiment of an apparatus 300 that may be used to transmit WUS. The apparatus 300 includes one embodiment of the base unit 104. Furthermore, to the base unit 104 may include at least one of a processor 302, a memory 304, an input device 306, a display 308, a transmitter 310 and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 is used to transmit signaling to the remote unit. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
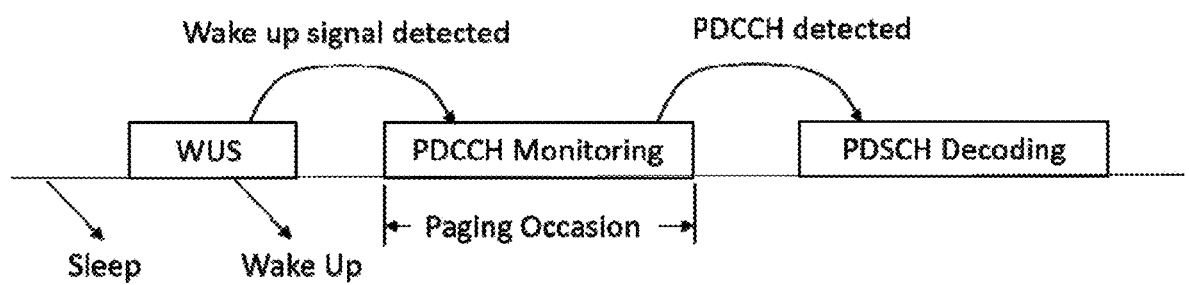
FIG. 4 is a schematic illustrating WUS function and related processed at a UE.

FIG. 4 is a schematic illustrating WUS function and related processed at a UE in NB-IoT.

In NB-IoT, wake up signal is designed for power saving. E-UTRAN uses WUS to indicate that the UE shall attempt to receive a paging message in the cell.

If a UE supports WUS and WUS configuration is provided in System Information, the UE shall monitor WUS using the WUS parameters provided in System Information. The WUS configuration includes time-offset between the end of WUS and the start of the first PO which UE is required to monitor. WUS is cell-specific configured with a maximal WUS duration, expressed as a ratio of maximal repetition number of Narrowband PDCCH (NPDCCH) for paging.

As shown in FIG. 4, upon receiving a WUS, a UE in sleep state will wake up. Next, according to the information carried in the detected wake up signal, the UE knows the PO. In the PO, the UE monitors PDCCH. After detecting PDCCH transmission, UE will decode PDSCH transmission based on the control data carried in the detected PDCCH transmission.

Figure 5:
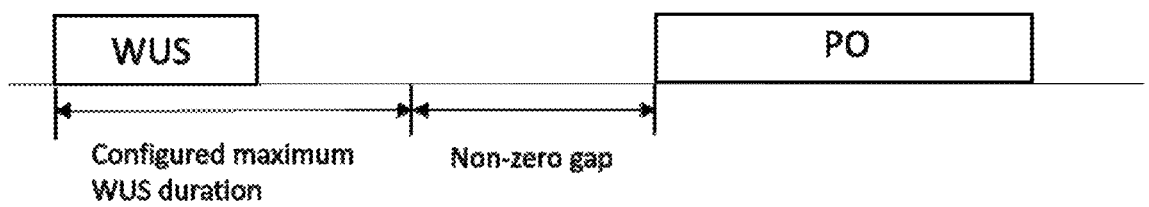
FIG. 5 is a schematic illustrating an example of WUS configuration.

FIG. 5 is a schematic illustrating an example of WUS configuration.

WUS duration is the maximum time duration configured by the network for a UE to detect a WUS. The network leaves a time gap after the WUS to allow the UE to resynchronize to the network and eventually switch from a low-power state to a normal state in order to be ready to decode the PDCCH transmission.

The UE is configured with a transmission duration of WUS by higher layers. In a UE's DRX cycle, the UE knows that the WUS time location is configurable with respect to the associated PO location. The maximum duration of WUS is configured in SIB per NB-IoT carrier. Actual transmission duration for a WUS may be shorter than the configured maximum duration of WUS as shown in FIG. 5. The non-zero gap from the end of the configured maximum WUS duration to the beginning of an associated PO is configured as a number of absolute subframes by higher layer.

Figure 6:
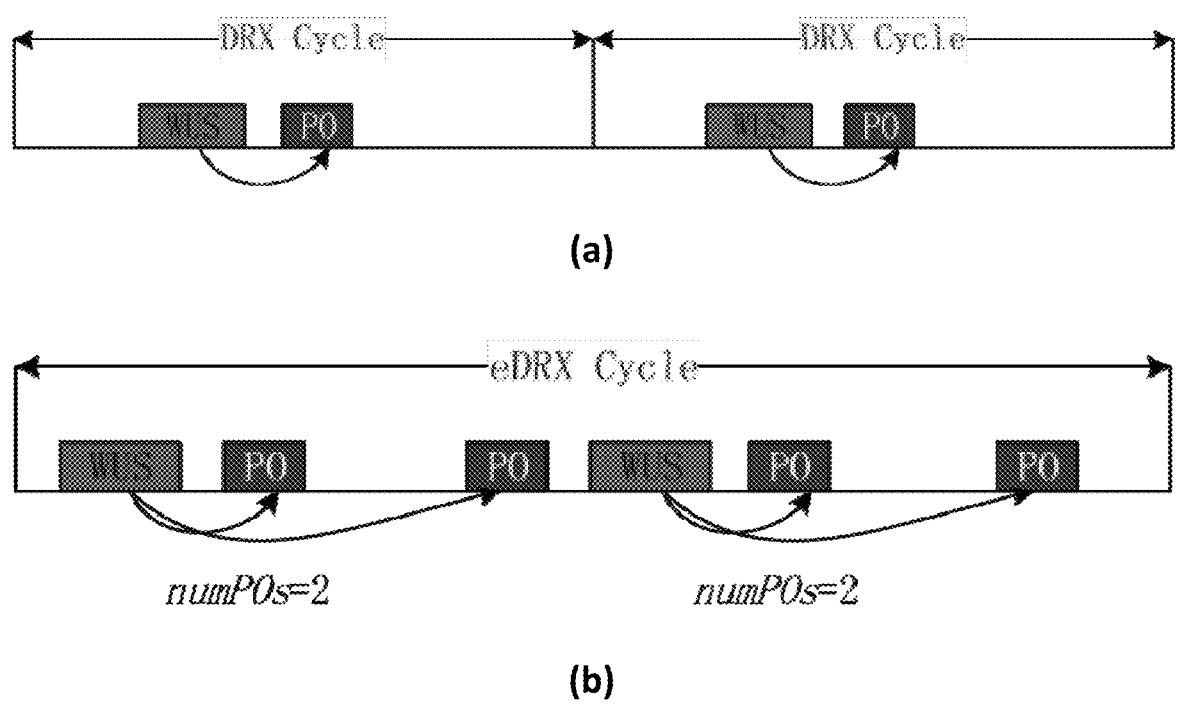
FIG. 6 is a schematic illustrating an example of WUS in DRX and eDRX cycle.

FIG. 6 is a schematic illustrating an example of WUS in DRX and eDRX cycle.

When DRX is used and the UE detects a WUS, the UE shall monitor an associated PO following the WUS. When eDRX is used and the UE detects a WUS, the UE shall monitor one or more associated POs following the WUS. If the UE does not detect a WUS, the UE is not required to monitor the following PO(s). If the UE has missed a WUS occasion (e.g. due to cell reselection), the UE monitors every PO until the start of next WUS. The number of the one or more POs to be monitored in eDRX is numPOs.

numPOs=Number of consecutive Paging Occasions (POs) mapped to one WUS provided in System Information, where numPOs 1.

In eDRX, when receiving a WUS, the UE should monitor a maximum of numPOs POs, until a paging message including the UE's Non-Access Stratum Identity (NAS ID) is received.

FIG. 6(a) shows the DRX case. In each DRX cycle, UE shall monitor the following PO associated with the received WUS. FIG. 6(b) is an example of WUS in eDRX cycle. In each eDRX cycle, UE monitors the following 2 POs associated with the received WUS, if numPOs=2.

The sequence of Narrowband WUS (NWUS) in NB-IoT will be described.

The NWUS sequence is specified in the standard, for example, Clause 10.2.6B "Narrowband wake up signal (NWUS)" in 3GPP TS 36.211. The NWUS sequence w(m) in subframe x=0, 1, . . . , M−1 is defined by Equation 1.

$$w(m) = \theta_{n_f,n_s}(m')e^{j\frac{\pi u n(n+1)}{131}} \quad \text{[Equation 1]}$$

$$m = 0, 1, \ldots, 131$$

$$m' = m + 132x$$

$$n = m \bmod 132$$

$$\theta_{n_f,n_s}(m') =$$

$$\begin{cases} 1 & \text{if } c_{n_f,n_s}(2m') = 0 \text{ and } c_{n_f,n_s}(2m'+1) = 0 \\ -1 & \text{if } c_{n_f,n_s}(2m') = 0 \text{ and } c_{n_f,n_s}(2m'+1) = 1 \\ j & \text{if } c_{n_f,n_s}(2m') = 1 \text{ and } c_{n_f,n_s}(2m'+1) = 0 \\ -j & \text{if } c_{n_f,n_s}(2m') = 1 \text{ and } c_{n_f,n_s}(2m'+1) = 1 \end{cases}$$

$$u = \left(N_{ID}^{cell} \bmod 126\right) + 3$$

where M is the actual duration of an NWUS.

The scrambling sequence $c_{n_i,n_s}(i)$, i=0, 1, . . . , 2·132M−1 is given by Clause 7.2 "Pseudo-random sequence generation" in 3GPP TS 36.211, and shall be initialized at the start of the NWUS with Equation 2.

$$c_{init\_WUS} = \left(N_{ID}^{Ncell} + 1\right) \quad \text{[Equation 2]}$$

$$\left(\left(10 n_{f\_start\_PO} + \left\lfloor\frac{n_{s\_start\_PO}}{2}\right\rfloor\right) \bmod 2048 + 1\right) 2^9 + N_{ID}^{Ncell}$$

where $n_{f\_start\_PO}$ is an index of the first frame of the first PO to which the NWUS is associated, $n_{s\_start\_PO}$ is an index the first slot of the first PO to which the NWUS is associated, and $N_{ID}^{Ncell}$ is narrowband physical cell ID.

Figure 7:
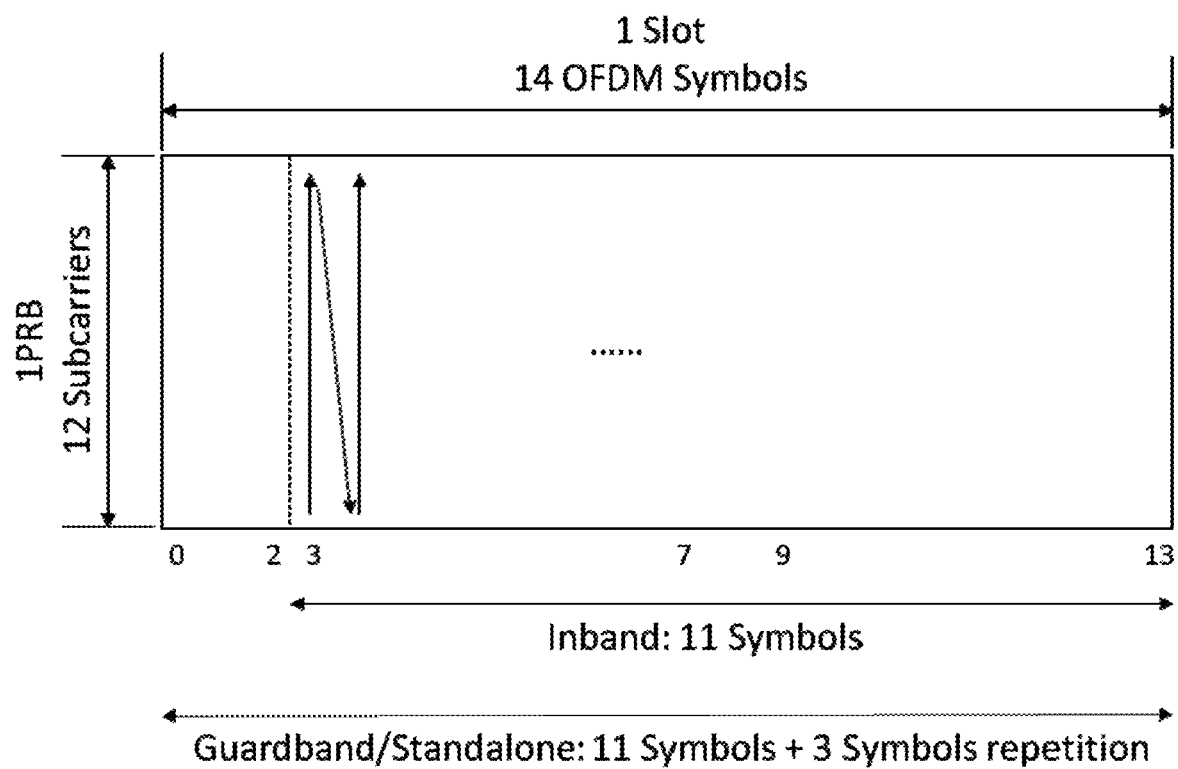
FIG. 7 is a schematic illustrating an example of WUS sequence mapping in a basic resource unit.

FIG. 7 is a schematic illustrating an example of WUS sequence mapping in a basic resource unit.

In NB-IoT, a WUS sequence, referred to as base sequence, is mapped within one subframe as a basic resource unit and repeated/extended for multiple subframes to support larger coverage. For inband operation mode (i.e., using one PRB of an LTE carrier), the WUS sequence is mapped to symbols 3-13 within one subframe. For guardband operation mode (i.e., using resource blocks within LTE carrier guard band) or standalone operation mode (i.e., using a GSM 200 kHz carrier), the content mapped to symbols 7, 8, 9 is also mapped to symbols 0, 1, 2 respectively.

As shown in FIG. 7, the basic resource unit is consisted of a PRB including 12 subcarriers in the frequency domain and a subframe including 14 OFDM symbols in the time domain. For inband operation, the WUS sequence is mapped to symbols 3-13 in one subframe among the 12 carriers. For guardband or standalone operation mode, the mapping on symbols 7, 8 and 9 is repeated on symbols 0, 1 and 2 respectively.

Figure 8:
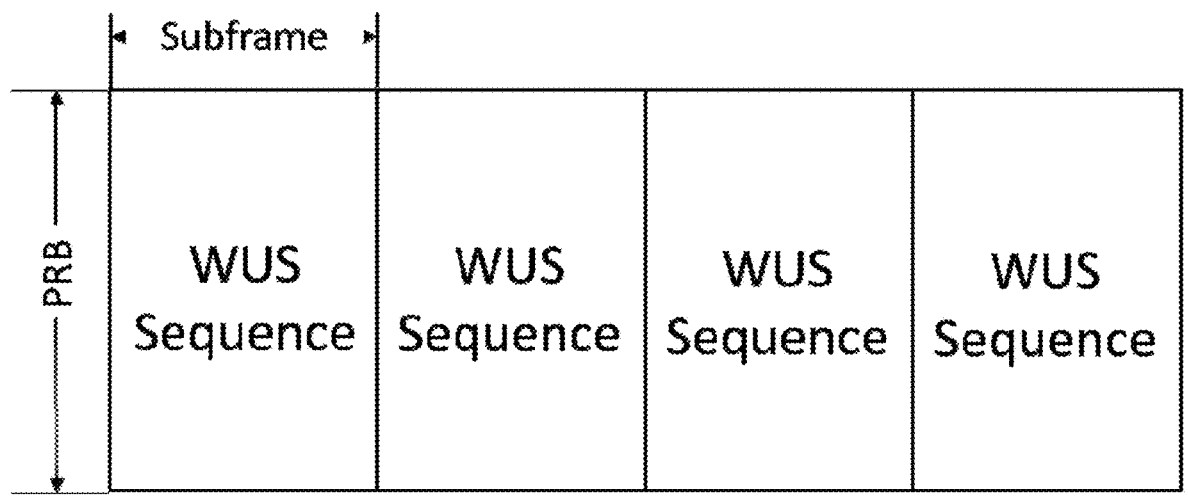
FIG. 8 is a schematic illustrating an example of WUS repetition.

FIG. 8 is a schematic illustrating an example of WUS repetition.

After mapping a WUS sequence into a basic resource unit, the mapped WUS sequence is repeated for multiple times to form a WUS. In NB-IoT, the basic resource unit is a subframe, and the mapped WUS sequence is repeated for multiple subframes.

As shown in FIG. 8, a subframe is the basic resource unit. WUS sequence is mapped in one subframe as discussed with reference to FIG. 7. The mapped WUS sequence is repeated for multiple subframes. As per the example shown in FIG. 8, WUS sequence is repeated on 4 subframes.

Figure 9:
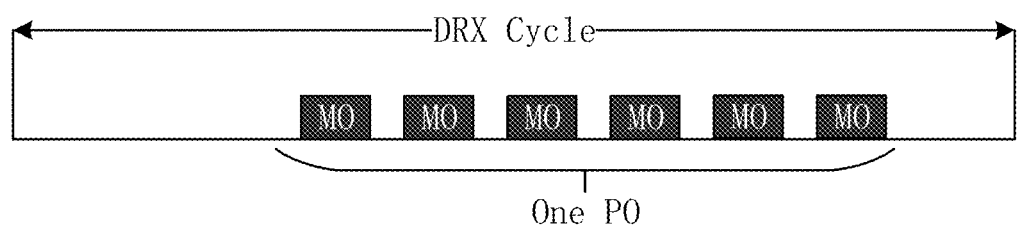
FIG. 9 is a schematic illustrating an example of PO setting in NR.

FIG. 9 is a schematic illustrating an example of PO setting in NR.

In NR, the UE monitors one PO per DRX cycle. A PO is a set of consecutive PDCCH monitoring occasions (MOs) and can consist multiple time durations (e.g. subframes or OFDM symbols) where paging message can be sent. As shown in FIG. 9, one PO is within a DRX cycle. The PO consists a plurality of MOs, for example, 6 MOs.

In multi-beams operation, the length of one PO is the time period of beam sweeping and the UE can assume that same paging message is repeated in all beams of a sweeping pattern. One configuration of PO setting is according to paging search space and the first PDCCH MO of a PO. The PDCCH MOs for paging are determined as described in 3GPP TS38.304.

Figure 10:
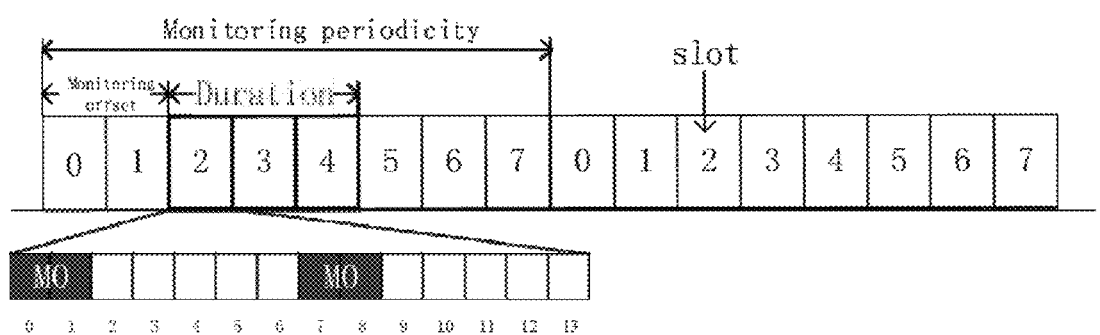
FIG. 10 is a schematic illustrating an example of search space set in NR.

FIG. 10 is a schematic illustrating an example of search space in NR.

In NR, the MO setting is associated to search space and CORESET configuration for PDCCH transmission. An example is given in FIG. 10. The corresponding parameter values are given in Table 1.

TABLE 1

Example of search space configuration

| | |
|---|---|
| monitoringSlotPeriodicity | 8 |
| offset | 2 |
| Duration of search space set | 3 |
| monitroingSymbolsWithinSlot | 10000001000000 |

'monitoringSlotPeriodicity' indicates the monitoring periodicity in slots. As per the example of Table 1 and FIG. 10, the monitoring periodicity is 8 slots.

'offset' indicates the offset of the search space with respect to the symbol 0 in one slot. Since offset=2 in Table 1, the search space begins at symbol 2 as shown in FIG. 10.

'Duration of search space set' indicates the duration of the search space. In this example, the duration is 3 slots. Therefore, slots 2-4 is the duration of search space as shown in FIG. 10. The PDCCH monitoring should be made in slots 2-4.

'monitoringSymbolsWithinSlot' indicates the first symbol(s) for PDCCH monitoring in the slots configured for PDCCH monitoring. From 'monitroingSymbolsWithinSlot' in Table 1, symbols 0 and 7 are the first symbols for PDCCH monitoring in one slot.

The duration of a MO may dependent on the duration of a CORESET for the PDCCH transmission. Assuming the CORESET duration is 2 symbols in this example, symbols 0 and 1, symbols 7 and 8 are separately two PDCCH MOs in a slot as shown in FIG. 10.

Figure 11:
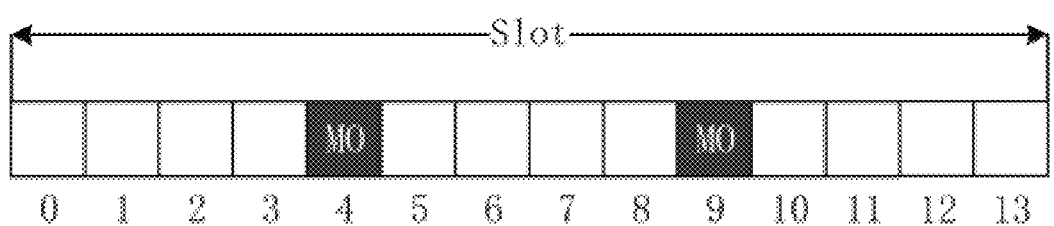
FIG. 11 is a schematic illustrating an example of multiple MOs in one slot.

FIG. 11 is a schematic illustrating an example of multiple MOs in one slot.

Enhancement from NB-IoT WUS is an effective technology to reduce power consumption. However, the requirements of NR-light are different from NB-IoT, and the configuration of NR is different from that of NB-IoT. The following issues should be considered when enhancing NB-IoT WUS for NR-light usage.

NB-IoT WUS is mapped within one subframe and repeated for a long time. In terms of time, NB-IoT WUS does not meet the requirement of NR-light whose time requirement is more stringent.

In NR, the bandwidth is wider, so usage of the frequency domain resource should be considered. The information on frequency resources for WUS transmission should be considered for interference randomization.

The NB-IoT WUS sequence is determined by the frame and subframe information of the first associated PO. But there may be multiple MOs occupying different symbols in a slot in one PO in NR-light as shown in FIG. 11. Therefore the NB-IoT WUS sequence cannot prevent false alarm among MOs in one PO due to absence of MO related information.

In order to address, among others, the issues mentioned above, novel WUS transmission methods for NR-light are proposed in the invention.

Figure 12:
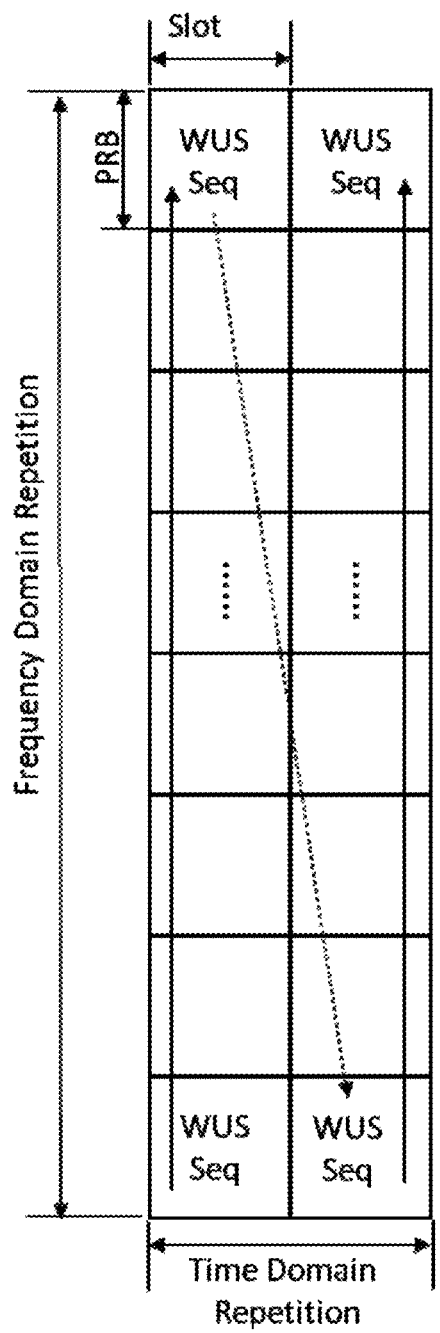
FIG. 12 is a schematic illustrating WUS repetition according to an embodiment of the invention.

FIG. 12 is a schematic illustrating WUS mapping according to an embodiment of the invention.

Similar to NB-IoT, a WUS is generated by a plurality of base sequences, i.e., WUS sequence. Each WUS sequence is mapped to a basic resource unit. The basic resource unit is a slot over a PRB, instead of a subframe over a PRB.

After mapping, the mapped WUS sequence is repeated in frequency resources and time resources in a frequency first-time second manner to form a WUS. According to an embodiment, the maximum repetition number may be configured by higher layer.

According to an embodiment, the repetition times for the WUS sequence in frequency domain, i.e., the frequency domain repetition number of the base resource unit, may be configured by higher layer. Alternatively, the frequency domain repetition number may be 1.

The repetition times for the WUS sequence in time domain, i.e., the time domain repetition number of the base resource unit, may be calculated according to the maximum repetition number and the frequency domain repetition number.

As per the example shown in FIG. 12, since the maximum repetition number is 16 and the frequency domain repetition number is 8, the time domain repetition number is 16/8=2.

As shown in FIG. 12, the WUS sequence is repeated in 8 PRBs and in 2 slots in a frequency first and time second manner.

According to another embodiment, the time domain repetition number may be configured by the higher layer, and the maximum repetition number may be calculated according to the frequency domain repetition number and the time domain repetition number.

Please note that the number of WUS sequences transmitted actually may be less or equal to the maximum repetition number.

Figure 13:
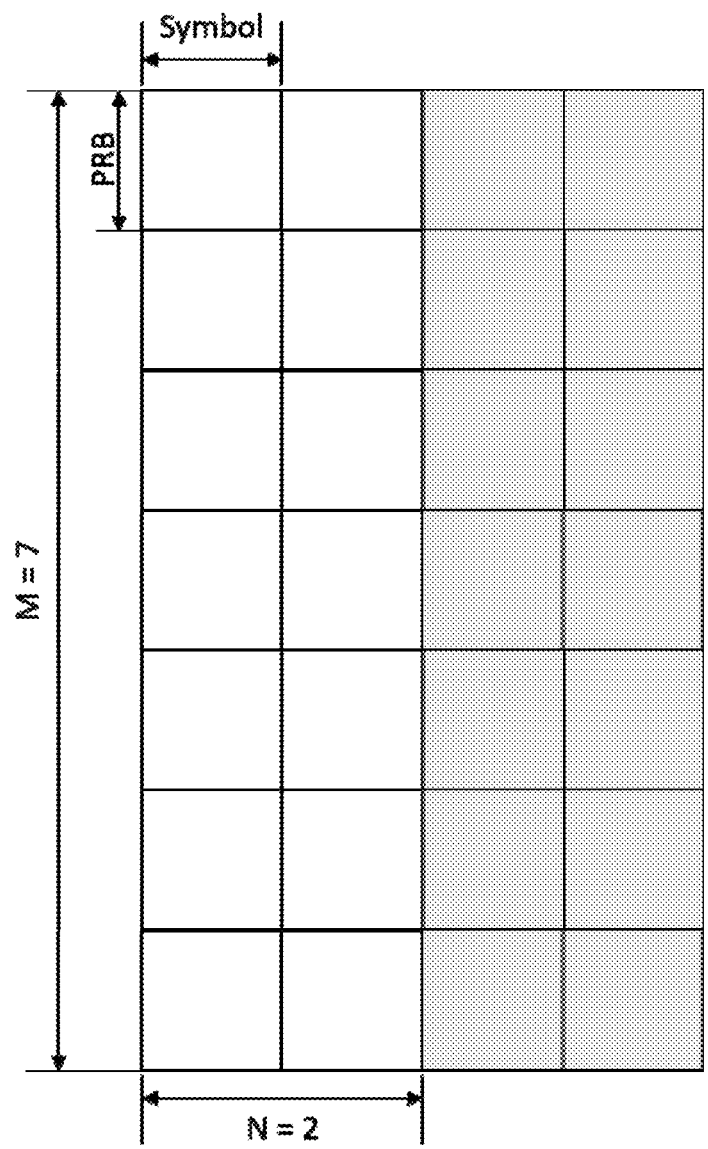
FIG. 13 is a schematic illustrating WUS repetition according to another embodiment of the invention.

FIG. 13 is a schematic illustrating WUS mapping according to another embodiment of the invention.

A WUS sequence is mapped to a basic resource unit. The basic resource unit is consisted of M continuous PRBs in the frequency domain and N continuous OFDM symbols within a slot in the time domain.

According to an embodiment, M may be configured by higher layer.

N may be determined according to the sequence length of the WUS sequence and M. As per the example shown in FIG. 13, since the sequence length is 168 and assuming that M is 7, N is 168/(12*7)=2.

After mapping the WUS sequence in the basic resource unit consisted of M PRBs and N symbols, the mapped WUS sequence is repeated in frequency resources and time resources in a frequency first-time second manner. The maximum repetition number may be configured by higher layer.

According to an embodiment, the frequency domain repetition number may be configured by higher layer. Alternatively, the frequency domain repetition number may be 1.

Time domain repetition number may be calculated according to the maximum repetition number and frequency domain repetition number.

As per the example shown in FIG. 13, assuming the maximum repetition number is configured as 2, since the frequency domain repetition number is 1, the time domain repetition number is 2/1=2.

As shown in FIG. 13, the WUS sequence is mapped in a basic resource unit consisted of 7 PRBs and 2 symbols. The mapped WUS sequence is repeated in the frequency domain one time and in the time domain two times.

According to another embodiment, the time domain repetition number may be configured by the higher layer, and the maximum repetition number may be calculated according to the frequency domain repetition number and the time domain repetition number.

As mentioned before, the number of WUS sequences may be less or equal to the maximum repetition number.

Figure 14:
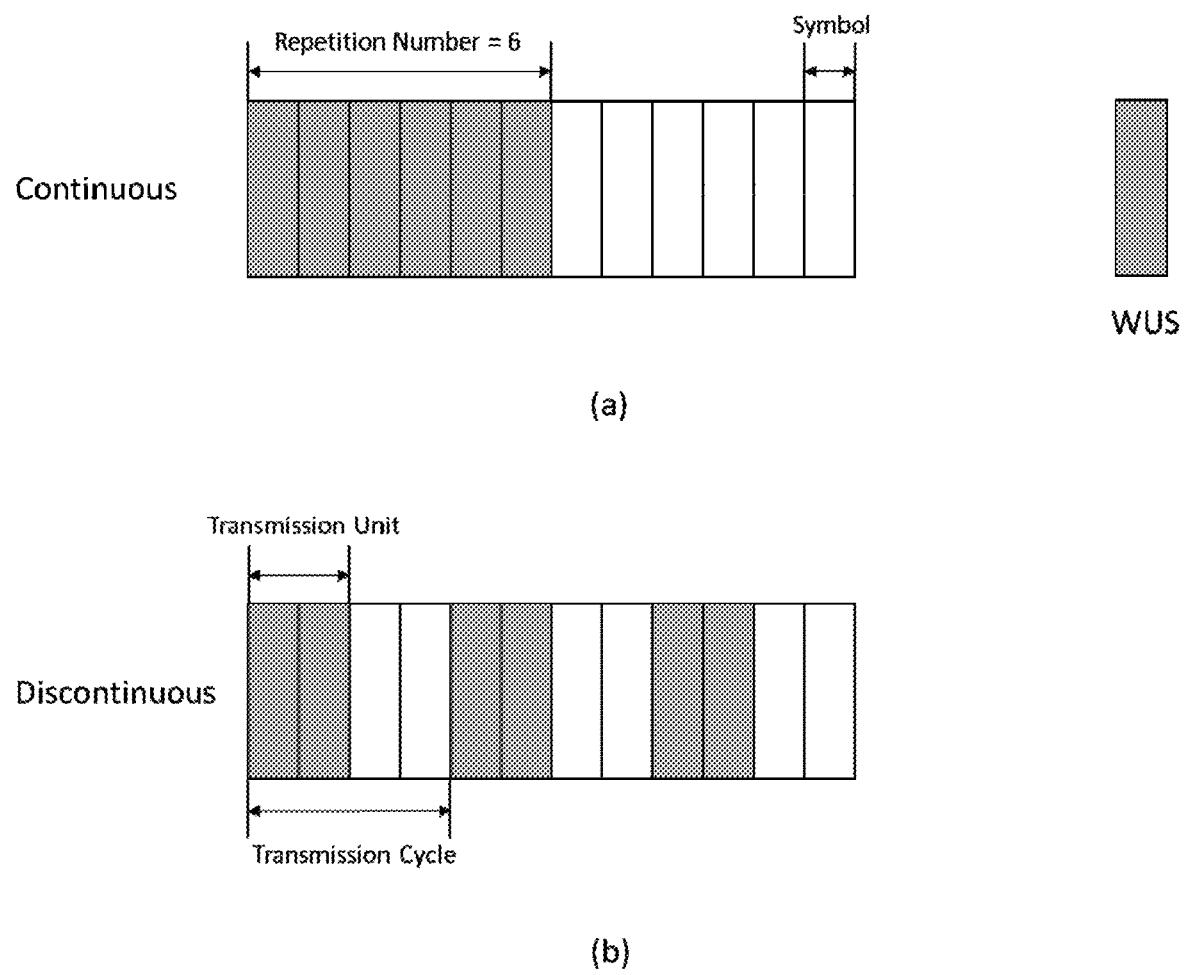
FIG. 14 is a schematic illustrating the time domain transmission type according to embodiments of the invention.

FIG. 14 is a schematic illustrating the time domain transmission type according to embodiments of the invention.

In the description with reference to FIGS. 12-13, mapped WUS sequence is repeated in the time domain. The time domain transmission type may be continuous transmission or discontinuous transmission.

Continuous transmission is short in duration, and therefore time diversity gain is small. Discontinuous transmission is extended in time, which can get more time diversity gain. And short discontinuous transmission within the time period of beam sweeping can give transmission opportunity for WUSs of other beam directions of the beam sweeping.

Discontinuous transmission is defined with a transmission unit and a transmission cycle. The transmission unit may be configured by higher layer. Alternatively, the transmission unit may be determined according to the duration of a CORESET associated with the search space. For example, if the duration of a CORESET associated with the search space is configured to be 2 symbols, the transmission unit is 2 repetitions.

According to an embodiment, the transmission cycle may be configured by higher layer.

According to an embodiment, the time duration of the transmission cycle may be the time period of beam sweeping.

As per the example shown in FIG. 14, it is assumed that N=1 for the basic resource unit, frequency domain repetition number=1, and maximum repetition number=6.

FIG. 14(a) shows the case of continuous transition, where WUS is transmitted in 6 continuous symbols.

FIG. 14(b) shows the case of discontinuous transmission. It is assumed that the transmission unit is 2 repetitions according to the duration of the CORESET and the transmission cycle is 4 symbols. In the first transmission cycle, WUS sequence is repeated in the first 2 symbols. There are 3 transmission cycles so that WUS sequence is repeated to 6 times.

Figure 15:
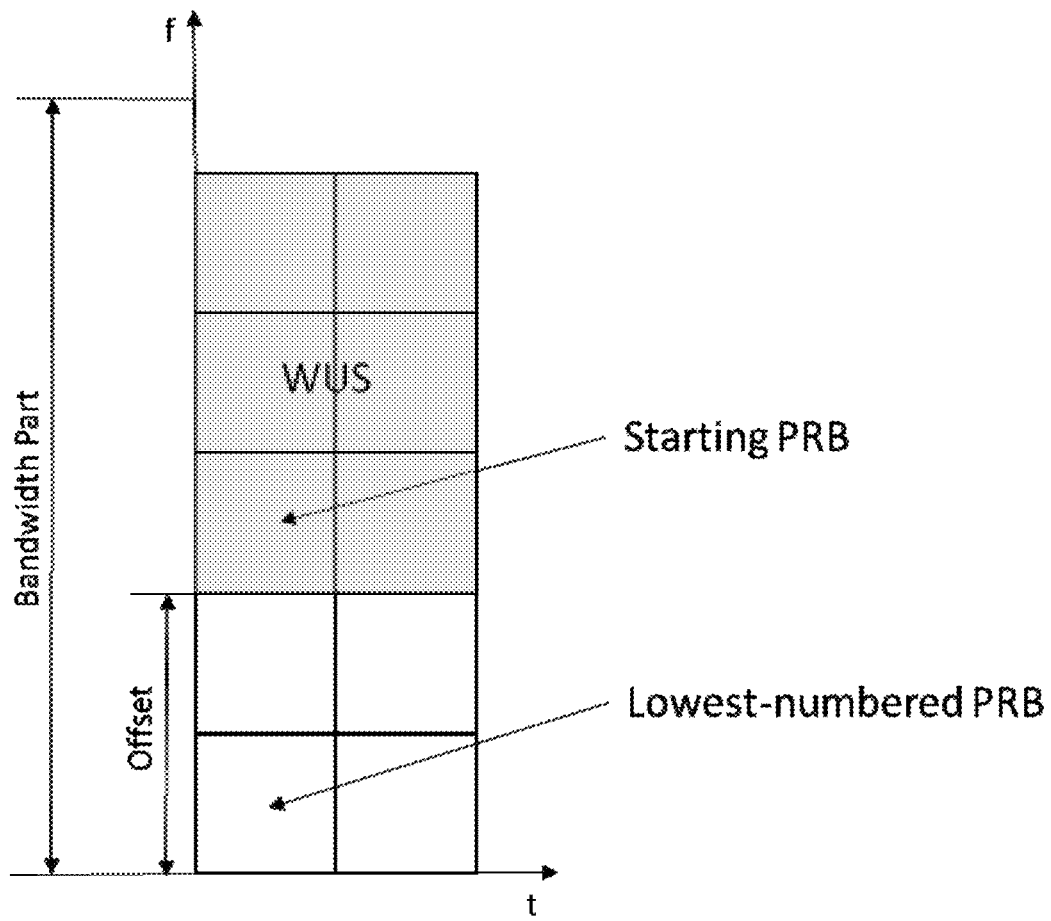
FIG. 15 is a schematic illustrating the frequency position for WUS transmission according to embodiments of the invention.

FIG. 15 is a schematic illustrating the frequency position for WUS transmission according to embodiments of the invention.

In terms of frequency resource, according to the description with reference to FIGS. 12-13, the basic resource unit and the frequency repetition number have been determined. However, the specific position for the frequency resource in the bandwidth has not been determined.

The position for the frequency resource may be configured by higher layer. For example, higher layer may configure an offset from a reference point to the starting PRB for WUS transmission. As per the example shown in FIG. 15, the offset indicates a number of PRBs from the lowest-numbered PRB in the Bandwidth Part(BWP) where the WUS is to the starting PRB for the WUS transmission. BWP is a subset of contiguous common resource blocks which are numbered from 0 and upwards in the frequency domain. In NR, a UE may be configured with up to four BWPs in the downlink with a single downlink BWP being active at a given time. The BWP where the WUS is may be an initial downlink BWP, a first active downlink BWP, or a default downlink BWP among the configured downlink BWPs.

The determination of basic resource unit, frequency domain repetition number, time domain repetition number, time domain transmission type, frequency position for WUS transmission have been described above with reference to FIGS. 12-15.

The design for WUS sequence will be described below.

The NWUS sequence for NB-IoT has been described with reference to Equation 1 and Equation 2. The WUS sequence for NB-light may be designed similarly.

The NWUS is determined by the frame and subframe information of the first associated PO. However, there may be multiple MOs occupying different symbols in a slot in one PO in NR-light. Therefore, the WUS sequence for NR-light may contain the information of MO. For example, the scrambling sequence in Equation 1 may contain the information of the slot index and symbol index for the first associated MO.

One example for the initialization of the scrambling sequence is shown as Equation 3.

$$c_{init_{WUS}} = (N_{ID}^{Ncell}+1)((2^u \cdot 10 n_{f\_start\_MO} + 14 \cdot n_{s\_start\_MO} + n_{sym\_start\_MO}) \mod 2048+1)2^9 + N_{ID}^{Ncell} \qquad \text{[Equation 3]}$$

where $n_{f\_start\_MO}$ is the frame index of the start MO, $n_{s\_start\_MO}$ is the slot index of the start MO, $n_{sym\_start\_MO}$ is the symbol index of the start MO, and the definition for other variables are the same as those for Equation 1 and Equation 2.

In addition, a WUS sequence may contain the information of the frequency resources position for the transmission of the corresponding WUS. For example, the WUS sequence may contain the information of the starting PRB in the bandwidth for the transmission of the WUS. The information of the starting PRB in the bandwidth may be an index with reference to a reference point. The reference point may be common resource block 0 of the bandwidth.

Equation 4 is one example to indicate the the starting PRB index in the bandwidth.

$$c_{init_{WUS}} = (N_{ID}^{Ncell}+1)((2^u \cdot 10 n_{f\_start\_MO} + 14 \cdot n_{s\_start\_MO} + n_{sym\_start\_MO}) \bmod 2048+1)2^9 + N_{ID}^{Ncell} + n_{PRB}$$ [Equation 4]

where $n_{PRB}$ is the starting PRB index.

Figure 16:
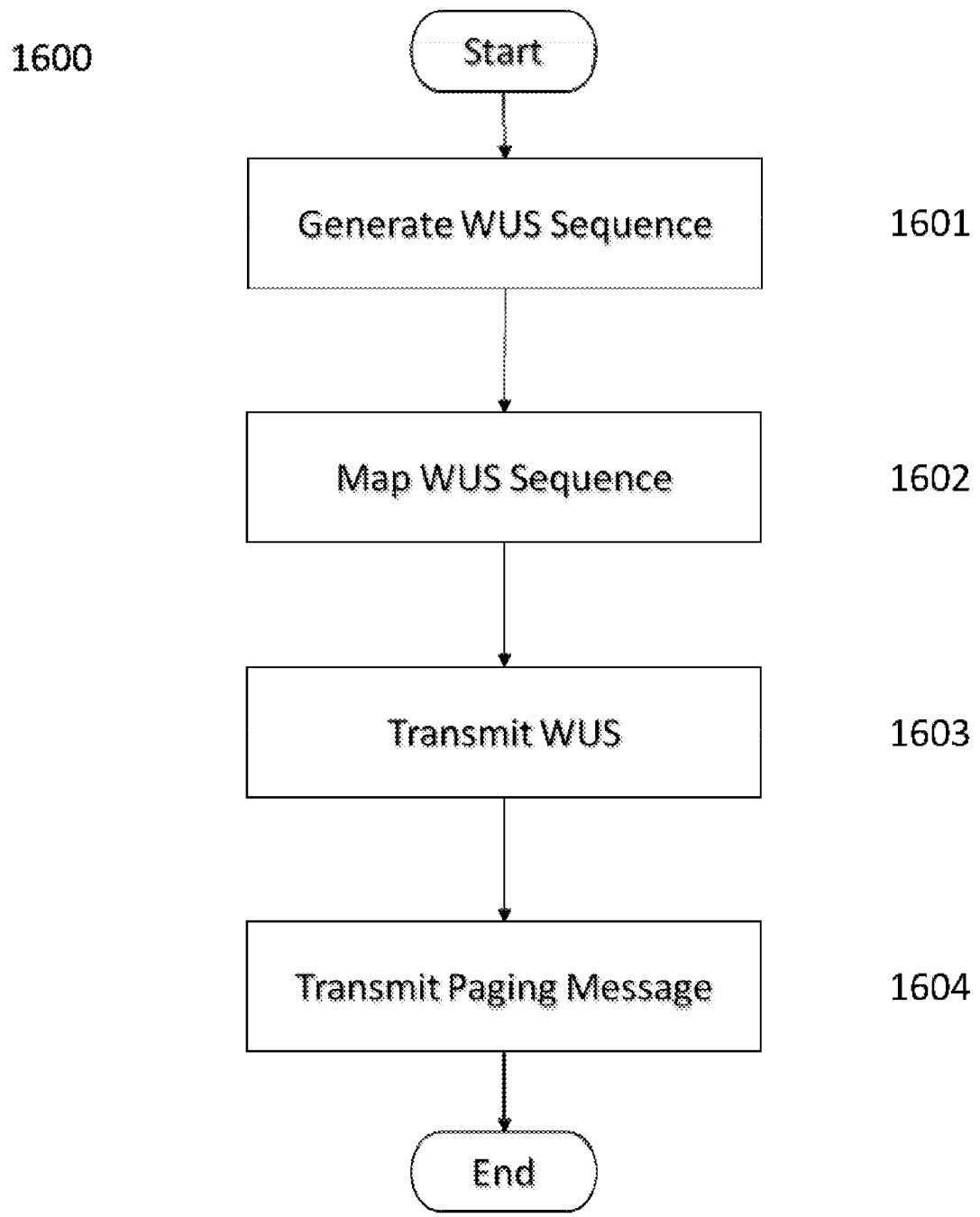
FIG. 16 is a flow chart illustrating a procedure performed at a gNB for WUS transmission according to the embodiments of the invention.

FIG. 16 is a flow chart illustrating a procedure performed at a gNB for WUS transmission according to the embodiments of the invention.

Procedure 1600 illustrates a method performed by a gNB to transmit WUS to a UE.

At step 1601, the gNB generates a WUS sequence. The generating procedure has been described with reference to Equation 1, Equation 2 and Equation 3. In the WUS sequence, the information related to the frame index, slot index and symbol index of the first associated MO, as well as the starting PRB index for the WUS transmission may be included.

At step 1602, the gNB maps the WUS sequence to a basic resource unit. The mapping procedure has been described with reference to FIG. 12 and FIG. 13.

At step 1603, the gNB transmits the WUS to a UE repeatedly. Specifically, the WUS sequences in basic resource units are transmitted to repeatedly. The repetition mode may be in a frequency first-time second manner. The determination of frequency domain repetition number, time domain repetition number, time domain transmission type, frequency position for WUS transmission have been described above with reference to FIGS. 12-15. The repetition number for the WUS sequence transmissions may be less or equal to the maximum repetition number.

At step 1604, the gNB transmits associated paging message on PDCCH to the UE.

Figure 17:
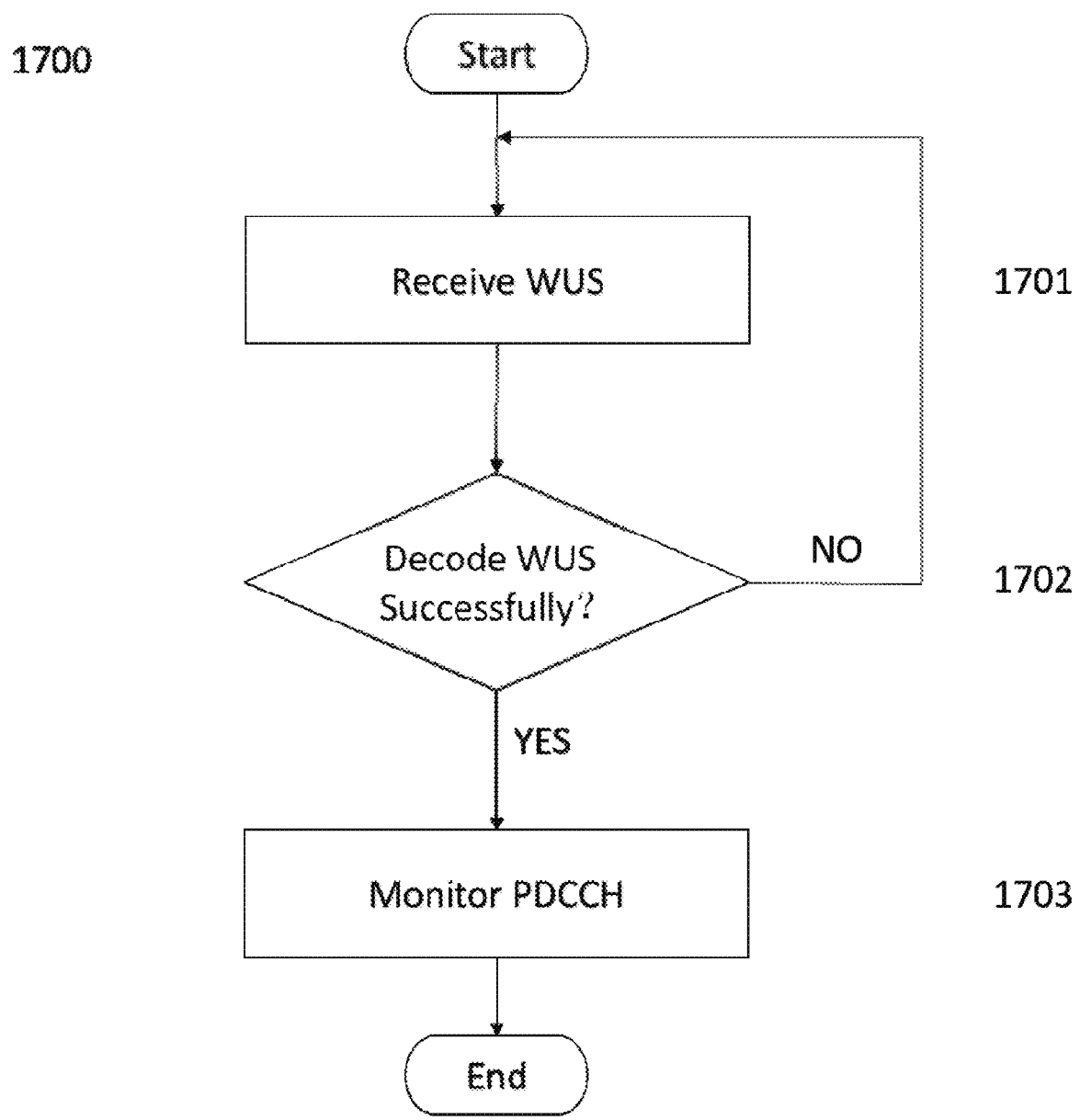
FIG. 17 is a flow chart illustrating a procedure performed at a UE for WUS reception according to the embodiments of the invention.

FIG. 17 is a flow chart illustrating a procedure performed at a UE for WUS reception according to the embodiments of the invention.

Procedure 1700 illustrates a method performed by a UE to receive WUS from a gNB.

At step 1701, the UE receivers WUS from a gNB. The WUS includes a plurality of WUS sequences each of which is in a basic resource unit. The WUS sequence may include the information related to the frame index, slot index and symbol index of the first associated PDCCH MO to be monitored.

At step 1702, the UE decides whether the WUS has been decoded successfully and the information carried in the WUS has been acquired.

If the WUS has been decoded (YES in step 1702), the procedure will proceed to step 1703; otherwise (NO in step 1702), the procedure will go back to step 1701.

At step 1703, the UE monitors associated PDCCH MOs according to the information acquired from the WUS.

It should be noted that the steps described above are not all necessary. It is possible to perform only some of these steps. The order of steps is also not mandatory but may be performed in other orders or in parallel. The execution of some steps requires signaling. The collective signaling described in the specification as being used for multiple steps may be replaced with separate signaling for individual step.

In the embodiments described above, the components and the features of the embodiments are combined in a predetermined form. Each component or feature should be considered as an option unless otherwise expressly stated. Each component or feature may be implemented independently of other components or features. Further, the embodiment may be configured by associating some components and/or features. The order of the operations described in the embodiments may be changed. Some components or features of any embodiment may be included in another embodiment or replaced with the component and the feature corresponding to that of another embodiment. It is apparent that the claims that are not expressly cited in the claims section are combined to form an embodiment or be included in a new claim.

The embodiments may be implemented by hardware, firmware, software, or combinations thereof. In the case of implementation by hardware, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and so on.

Embodiments may be practiced in other specific forms. The described embodiments are to be considered in all respects as illustrative and not restrictive. The scope of the invention is consequently indicated by the appended claims rather than by the foregoing description. All changes which come within the meaning and range of equivalency of the claims are to be embraced within their scope.

The invention claimed is:

1. A method at a base unit, comprising:
generating a wake up signal which indicates for a remote unit to attempt to receive a paging message in a paging occasion, the wake up signal generated according to one or more base sequences, and each of the one or more base sequences is mapped to a base resource unit, wherein the base resource unit includes M continuous physical resource blocks in frequency domain and N continuous orthogonal frequency division multiplexing symbols within a slot in time domain, where M and N are integers;
mapping the wake up signal to a frequency-time resource; and
transmitting, to the remote unit, the mapped wake up signal in the frequency-time resource.

2. The method of claim 1, further comprising determining M according to a bandwidth of a bandwidth part (BWP) where the wake up signal is, a subcarrier spacing of the BWP, and a sequence length of the one or more base sequences.

3. The method of claim 1, further comprising determining N based on a sequence length of the one or more base sequences and M.

4. The method of claim 1, further comprising determining a frequency resource of the frequency-time resource based at least in part on a start position in the frequency domain, a frequency domain repetition number of the base resource unit, and M.

5. The method of claim 4, further comprising determining the start position according to an offset configured by a higher layer of the base unit with reference to a reference position in a BWP where the wake up signal is.

6. The method of claim 1, further comprising determining a time resource of the frequency-time resource based at least in part on a time domain transmission type and a time domain repetition number of the base resource unit.

7. The method of claim 6, wherein the time domain transmission type is one of continuous transmission or discontinuous transmission with a time domain transmission unit and a time domain transmission cycle.

8. The method of claim 7, wherein the time domain transmission unit is determined according to a duration of a control resource set associated with a search space associated to the paging occasion.

9. The method of claim 1, wherein each of the one or more base sequences contains information related to at least one of a slot index and a symbol index for a first associated physical downlink control channel monitoring occasion in a corresponding paging occasion.

10. The method of claim 1, wherein each of the one or more base sequences contains frequency domain position information for transmission of the mapped wake up signal.

11. A base unit, comprising:
a transmitter;
a processor coupled to the transmitter, the processor and the transmitter configured to cause the base unit to:
generate a wake up signal that indicates a remote unit to attempt to receive a paging message in a paging occasion, the wake up signal generated according to one or more base sequences, each of the one or more base sequences is mapped to a base resource unit, wherein the base resource unit includes M continuous physical resource blocks in frequency domain and N continuous frequency division multiplexing symbols within a slot in time domain, where M and N are integers;
map the wake up signal to a frequency-time resource; and
transmit, to the remote unit, the mapped wake up signal in the frequency-time resource.

12. A remote unit, comprising:
a receiver;
a processor coupled to the receiver, the processor and the receiver configured to cause the remote unit to:
receive a wake up signal in a frequency-time resource; and
receive a paging message in a paging occasion according to the received wake up signal, the wake up signal comprising one or more base sequences each of which is mapped to a base resource unit, the base resource unit including M continuous physical resource blocks in frequency domain and N continuous orthogonal frequency division multiplexing symbols within a slot in time domain, where M and N are integers.

13. The remote unit of claim 12, wherein M is determined according to a bandwidth of a bandwidth part (BWP) where the wake up signal is, a subcarrier spacing of the BWP, and a sequence length of the one or more base sequences.

14. The remote unit of claim 12, wherein N is determined based on a sequence length of the one or more base sequences and M.

15. The remote unit of claim 12, wherein a frequency resource of the frequency-time resource is determined based at least in part on a start position in the frequency domain, a frequency domain repetition number of the base resource unit, and M.

16. The remote unit of claim 15, wherein the start position is determined according to an offset configured by a higher layer of the remote unit with reference to a reference position in a BWP where the wake up signal is.

17. The remote unit of claim 15, wherein a time resource of the frequency-time resource is determined based at least in part on a time domain transmission type and a time domain repetition number of the base resource unit.

18. The remote unit of claim 17, wherein the time domain transmission type is one of continuous transmission or discontinuous transmission with a time domain transmission unit and a time domain transmission cycle.

19. The remote unit of claim 18, wherein the time domain transmission unit is determined according to a duration of a control resource set associated with a search space associated to the paging occasion.

20. The remote unit of claim 12, wherein each of the one or more base sequences contains frequency domain position information for transmission of the wake up signal.

* * * * *